(12) United States Patent
Biller et al.

(10) Patent No.: US 9,180,780 B2
(45) Date of Patent: Nov. 10, 2015

(54) METHOD FOR CONTROLLING A MOTOR VEHICLE BRAKE SYSTEM

(75) Inventors: Harald Biller, Eschborn (DE); Alexander Schoenbohm, Frankfurt (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 64 days.

(21) Appl. No.: 13/876,602

(22) PCT Filed: Sep. 19, 2011

(86) PCT No.: PCT/EP2011/066196
§ 371 (c)(1),
(2), (4) Date: Mar. 28, 2013

(87) PCT Pub. No.: WO2012/041731
PCT Pub. Date: Apr. 5, 2012

(65) Prior Publication Data
US 2013/0204502 A1    Aug. 8, 2013

(30) Foreign Application Priority Data

Oct. 1, 2010   (DE) .......................... 10 2010 041 853

(51) Int. Cl.
*B60L 7/18* (2006.01)
*B60L 7/26* (2006.01)
(Continued)

(52) U.S. Cl.
CPC ... *B60L 7/18* (2013.01); *B60L 7/26* (2013.01); *B60T 1/10* (2013.01); *B60T 8/267* (2013.01);
(Continued)

(58) Field of Classification Search
CPC .............. B60W 10/08; B60W 10/188; B60W 30/18127; B60T 1/10; B60T 13/586; B60T 8/267; B60L 7/18; B60L 7/26
USPC ........................... 701/69, 70, 78, 81; 303/152
See application file for complete search history.

(56) References Cited

U.S. PATENT DOCUMENTS

| | | |
|---|---|---|
| 5,707,115 A | 1/1998 | Bodie et al. |
| 2003/0062770 A1 | 4/2003 | Sasaki et al. |

(Continued)

FOREIGN PATENT DOCUMENTS

| | | |
|---|---|---|
| DE | 198 10 656 A1 | 9/1999 |
| DE | 102 02 531 A1 | 8/2003 |

(Continued)

OTHER PUBLICATIONS

PCT International Search Report—Dec. 2, 2011.
(Continued)

*Primary Examiner* — Thomas Tarcza
*Assistant Examiner* — Kevin Myhre
(74) *Attorney, Agent, or Firm* — Brinks Gilson & Lione

(57) ABSTRACT

A method in which open- or closed-loop control of a motor vehicle brake system is carried out having friction brakes on the wheels of at least one axle, wherein the brake pressure generating means for the wheels of at least one axle are in a direct operative connection to the brake pedal, and at least one electrical machine is in an operative connection to at least one axle which can be used by applying an electrically regenerative braking torque for converting kinetic energy into electrical energy. In order to raise the efficiency level of the recuperation, the regenerative deceleration is increased even in the case of an unchanged brake pedal position and/or brake pedal force, and a motor vehicle brake system which is open-loop or closed-loop controlled.

14 Claims, 3 Drawing Sheets

(51) Int. Cl.
*B60T 1/10* (2006.01)
*B60T 8/26* (2006.01)
*B60T 13/58* (2006.01)
*B60W 10/08* (2006.01)
*B60W 10/188* (2012.01)
*B60W 30/18* (2012.01)

(52) U.S. Cl.
CPC .............. *B60T 13/586* (2013.01); *B60W 10/08* (2013.01); *B60W 10/188* (2013.01); *B60W 30/18127* (2013.01); *B60T 2220/04* (2013.01); *B60T 2270/604* (2013.01); *B60T 2270/608* (2013.01); *B60W 2520/10* (2013.01); *B60W 2710/083* (2013.01); *Y02T 10/56* (2013.01)

(56) References Cited

U.S. PATENT DOCUMENTS

2005/0159871 A1   7/2005   Nakamura et al.
2007/0216221 A1*  9/2007   Zillmer et al. ................ 303/152
2010/0105520 A1   4/2010   Ohbayashi et al.

FOREIGN PATENT DOCUMENTS

| | | |
|---|---|---|
| DE | 103 41 678 A1 | 3/2004 |
| DE | 103 32 207 A1 | 2/2005 |
| DE | 10 2004 044 599 A1 | 4/2005 |
| DE | 10 2004 030 641 A1 | 7/2005 |
| DE | 10 2004 025 830 A1 | 8/2006 |
| DE | 10 2005 057 285 A1 | 3/2007 |
| DE | 10 2006 055 765 A1 | 1/2008 |
| DE | 10 2007 010 188 A1 | 9/2008 |
| WO | WO 2004/101308 A1 | 11/2004 |
| WO | WO 2006/000560 A1 | 1/2006 |
| WO | WO 2006/076999 A1 | 7/2006 |

OTHER PUBLICATIONS

German Examination Report—Jun. 29, 2011.

* cited by examiner

METHOD FOR CONTROLLING A MOTOR VEHICLE BRAKE SYSTEM

CROSS-REFERENCE TO RELATED APPLICATIONS

This application claims priority to German Patent Application No. 10 2010 041 853.6, file Oct. 1, 2010 and PCT/EP2011/066196, filed Sep. 19, 2011.

FIELD OF THE INVENTION

The invention relates to a method of controlling a motor vehicle brake system.

BACKGROUND OF THE INVENTION

Regenerative brake systems in motor vehicles make it possible for at least a portion of the energy applied during braking to be stored in the vehicle and re-used for driving the vehicle. As a result, the energy consumption of the vehicle overall can be lowered and the operation can therefore be made more economical. Motor vehicles with a regenerative brake system generally have different types of brake actuators for this purpose.

In this context, hydraulic friction brakes such as are known from conventional motor vehicles and an electrically regenerative brake are generally used. The brake pressure for the friction brakes is applied via a brake pressure generating means or via the brake pedal movement as in conventional friction brakes. The electrically regenerative brake is generally embodied as an electric machine/machines actuated in the generator mode and via which at least a portion of the entire braking power is applied. The acquired electrical energy is fed into or back to a storage medium such as, for example, an on-board battery and re-used for driving the motor vehicle, wherein either suitable actuation of the electric machine/machines or a number of at least one separate electric motors is used.

Conventional brake systems which exclusively have friction brakes decelerate the vehicle depending on the position of the brake pedal and the pressure of a braking means is built up with or without auxiliary energy, which braking means is taken up by the friction brake or brakes which subsequently apply a corresponding braking torque to the wheels. The pedal position therefore corresponds to the braking behavior of the motor vehicle. Exceptions may occur in the case of interventions by electronic safety systems such as the electrical stability program (ESP), which can comprise devices for automatically building up pressure irrespective of the brake pedal position.

This clear relationship between the pedal position and the braking behavior is not provided without further measures in the case of the drag torque which is applied by a generator. WO 2004/101308 A1 discloses a brake system and a method for closed-loop controlling a brake system of a motor vehicle which has an electrically regenerative brake, in particular a generator and a number of hydraulic friction brakes driven by at least one brake pressure generating means via a braking medium, the overall deceleration of which is made up of deceleration portions of the friction brakes and of the electrically regenerative brake. In order to achieve the highest possible level of braking comfort and a pleasant braking sensation, braking medium is diverted into a low-pressure accumulator in the case of braking with the electrically regenerative brake.

Furthermore in the case of constant generator power, the torque which is taken up by a generator decreases significantly as the speed increases, wherein energy recovery is no longer possible below a limiting speed of approximately 15 km/h. DE 10 2004 044 599 A1 describes a method for performing closed-loop control of a brake system of a motor vehicle which has an electrically regenerative brake, in particular a generator, and a number of hydraulic friction brake driven by a brake pressure generating means via a braking medium. In the case of a decrease in the braking torque of the electrically regenerative brake which occurs, in particular, when a minimum speed is undershot, the desired overall deceleration is at least partially maintained in that an additional build of a brake pressure for the friction brakes takes place with a further auxiliary-force-assisted brake pressure generating means, for example an electric hydraulic pump.

WO2006/076999 A1 discloses a method for controlling a brake system of a motor vehicle which has an electric generator and a number of friction brakes which are assigned to axles of the motor vehicle, and the overall deceleration of which is composed of deceleration components of the electric generator and of the friction brakes. The ratio of the setpoint deceleration components of a number of brakes with respect to one another is changed by means of a control device in that a correction value for a number of the brakes is determined from the ratio of the actual deceleration to the setpoint deceleration, which correction value is applied to the setpoint deceleration of these brakes. This method compensates, for example, for ageing of the friction brakes.

If a brake process is started in the case of a vehicle speed of 100 km/h, only a small regenerative braking deceleration is available. If the ratio between the regenerative braking torque and the braking torque generated by friction brakes is constant over the entire braking process, this restricts the recovered electrical energy, i.e. the efficiency level of the energy recovery, also referred to as recuperation, is low. In the case of an electro-hydraulic regenerative brake system, the activation of the brake pedal and the pressure build up are energetically separated and therefore the braking force distribution between the generator and the friction brakes is adapted continuously, wherein the hydraulically built-up friction braking torque is therefore reduced. If a conventional brake system is used, a simple reduction of pressure at the friction brakes is, however, not readily possible.

The object of the present invention is therefore to increase the efficiency level of the recuperation when using conventional friction brakes. The efficiency level of the recuperation is given by the ratio of recovered electrical energy and the total kinetic energy of the vehicle converted during the braking process.

This object is achieved by means of the method according to this invention.

INTRODUCTORY DESCRIPTION OF THE INVENTION

A method is therefore made available in which open- or closed-loop control of a motor vehicle brake system is carried out having friction brakes on the wheels of at least one axle, wherein the brake pressure generating means for the wheels of at least one axle are in a direct operative connection to the brake pedal, and at least one electrical machine is in an operative connection to at least one axle which can be used by applying an electrically regenerative braking torque for converting kinetic energy into electrical energy, in which in order to raise the efficiency level of the recuperation, the regenerative deceleration is increased even in the case of an unchanged brake pedal position and/or brake pedal force.

The term brake pressure generating means is understood to mean, for example, a tandem master brake cylinder or a single-circuit master brake cylinder. The term operative connection is understood to mean a direct mechanical or hydraulic connection via which the entire energy required for the generated effect is applied.

The invention is based on the idea that an electrically regenerative braking torque which is as large as possible is always to be applied in order to recover the largest possible portion of kinetic energy in the form of electrical energy. If the generator can make available increased regenerative deceleration with respect to the start of the braking process, this increase is to take place even in the case of an unchanged brake pedal position or brake pedal force. As a result, even more electrical energy is available for subsequent acceleration processes and the range of the electrical drive is increased.

It is advantageous if as the speed decreases a greater regenerative deceleration is requested, wherein the deceleration which is built up by friction brakes is correspondingly reduced. Generators with a constant power can make available greater deceleration at medium speeds than at high speeds. If the hydraulic brake system permits a stepless reduction in pressure, the efficiency level of the recuperation can be optimized even in the case of constant deceleration.

A decrease in the vehicle's own deceleration is expediently at least compensated by increasing the regenerative deceleration. Compensating the reduced vehicle's own deceleration does not reduce the braking comfort for the driver since when there is a fixed brake pedal position the deceleration also remains constant. At high speeds, the intrinsic deceleration is dominated by the wind resistance which increases quadratically with the speed. If a braking process is therefore started at a high speed, the deceleration decreases quickly during the braking process, which can be used for building up additional electrically regenerative deceleration. As a result, the range of the electrical drive increases.

In order to raise the efficiency level of the recuperation, the regenerative deceleration is also preferably increased beyond the amount corresponding to the brake pedal position or brake pedal force. If this takes place, in particular, in the case of a constant friction braking torque, the recovered electrical energy can be maximized even when conventional hydraulic friction brakes are used.

The additionally requested deceleration is particularly preferably selected as a function of the speed at the start of the braking process. At high speeds, a generator with constant power can apply a particularly small amount of electrically regenerative deceleration, for which reason optimizations during the braking process permit the efficiency level to be raised significantly.

The additionally requested deceleration is particularly preferably adapted continuously or quasi-continuously during the braking process. As a result, the maximum applied deceleration by the generator at the respective speed can be used in an optimum way during the entire braking process. Quasi-continuous adaptation means here that changed deceleration is requested in time periods which are brief compared to the duration of the braking process.

The additionally requested deceleration is most particularly preferably selected in proportion to the change in speed since the start of the braking process. In the case of strong braking operations, the additional deceleration therefore increases more quickly than in the case of weak braking operations, as a result of which overall a continuous efficiency level of the recuperation can be achieved virtually independently of the deceleration requested by the driver.

In particular, the proportionality constant is approximately 0.05 g to approximately 0.2 g per 100 km/h. The driver does not find the corresponding additional deceleration unpleasant.

It is particularly advantageous if the additionally requested deceleration is selected as a function of the deceleration at the start of the braking process. Since the driver perceives changes relatively, a relatively strong increase can take place even in the case of a relatively strong initial deceleration.

In an alternative particularly preferred embodiment of the invention, the additionally requested declaration is selected as a function of the duration of the braking process.

It is expedient if the stability of the driving state is checked, in particular by evaluating wheel speed information and/or the information from acceleration and/or yaw rate sensors. When a stable driving state is present, the braking torque at the axle or axles in an operative connection with an electric machine is open-loop or closed-loop controlled in such a way that said braking torque is greater than the braking torque present at the axle or axles braked only with friction brakes, in particular the entire deceleration is applied by an electrically regenerative braking torque. As a criterion for a stable driving state it is particularly preferably possible to check whether the slip at the rear axle exceeds a predefined limiting value. A generator on the rear axle can then also apply the entire braking deceleration in the case of braking operations which are uncritical in terms of driving stability, as a result of which a particularly high level of energy recovery is possible.

It is particularly expedient if when a stable driving state is present, the braking torque at a regeneratively braked rear axle is set up to 15% higher than corresponds to the fraction of the braking torque at the front axle which is to be applied according to an ideal braking force distribution. The ideal braking force distribution specifies the ratio of the front wheel braking torque to the rear wheel braking torque at which the frictional engagement between the tires and the carriageway is utilized to an optimum extent. Such limitation prevents over-braking of the rear axle by the generator from putting the driving stability at risk.

The invention also relates to a motor vehicle brake system comprising friction brakes at the wheels of at least one axle, wherein the brake pressure generating means for the wheels of at least one axle are in a direct operative connection to the brake pedal, and at least one electric machine is in an operative connection to at least one axle which, by applying an electrically regenerative braking torque, can be used to convert kinetic energy into electrical energy, wherein actuation or closed-loop control takes place according to the above-described method.

The invention also relates to the use of a brake system according to the invention in a motor vehicle having an internal combustion engine.

BRIEF DESCRIPTION OF THE DRAWINGS

Further preferred embodiments can be found in the dependent claims and the following description of an exemplary embodiment with reference to figures, of which:

FURTHER DETAILED DESCRIPTION OF THE INVENTION

Figure 1:
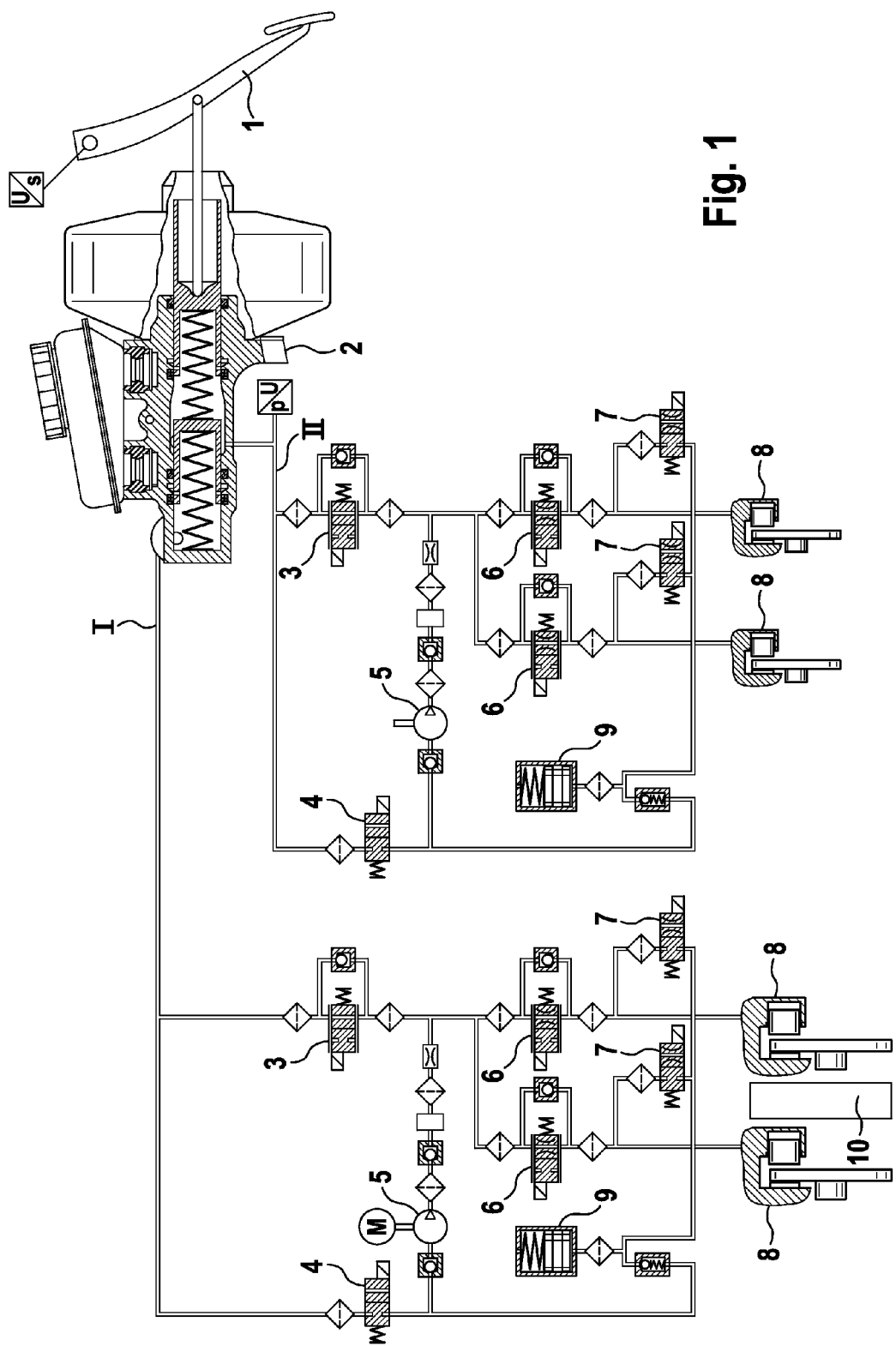
FIG. 1 shows a brake system for carrying out a method according to the invention.

FIG. 1 shows a regenerative brake system which is suitable for carrying out the method according to the invention. The brake pedal 1 which is activated by the driver acts directly on a tandem master cylinder 2 which is operated with or without auxiliary force. Said tandem master cylinder 2 builds up pressure in two essentially identical brake circuits I and II, wherein these can be assigned to the wheels either on an axle basis (front and rear) or else diagonally. The brake fluid flows through isolating valves 3 and inlet valves 6 into the brake cylinders 8 which apply a frictional braking force to the wheels. If the outlet valves 7 are opened, brake fluid can be discharged into the low-pressure accumulators 9. The hydraulic pumps 5 permit a pressure built up which is independent of the driver, wherein for this purpose the electronic switchover valves 4 are opened and the isolating valves 3 are closed. On one of the axles there is an electric generator 10 which permits electrically regenerative braking.

By means of a suitable switching sequence which is described below it is possible to make available a pedal sensation which is pleasant for the driver even in the case of regenerative braking processes. When the brake is activated, the outlet valves 7 are firstly opened, after which the volume displaced by the driver is taken up by the low-pressure accumulators 9. The braking deceleration is made available here by the generator. If the deceleration request by the driver which is derived from the pedal position exceeds the maximum possible generator deceleration the outlet valves 7 are closed. The pedal activation subsequently builds up pressure in the brake cylinders 8, and the friction brakes make available the additionally required braking torque.

Owing to the direct operative connection between the brake pedal and the brake cylinder, a reduction in pressure in the brake cylinders is not readily possible since a reaction on the brake pedal always takes place with a corresponding adverse effect on the pedal sensation. Furthermore, the outlet valves 7 usually cannot be finely regulated.

Basically, the method according to the invention can be used even in brake systems with a directly hydraulically activated brake system and an electromechanically activated brake system.

Figure 2:
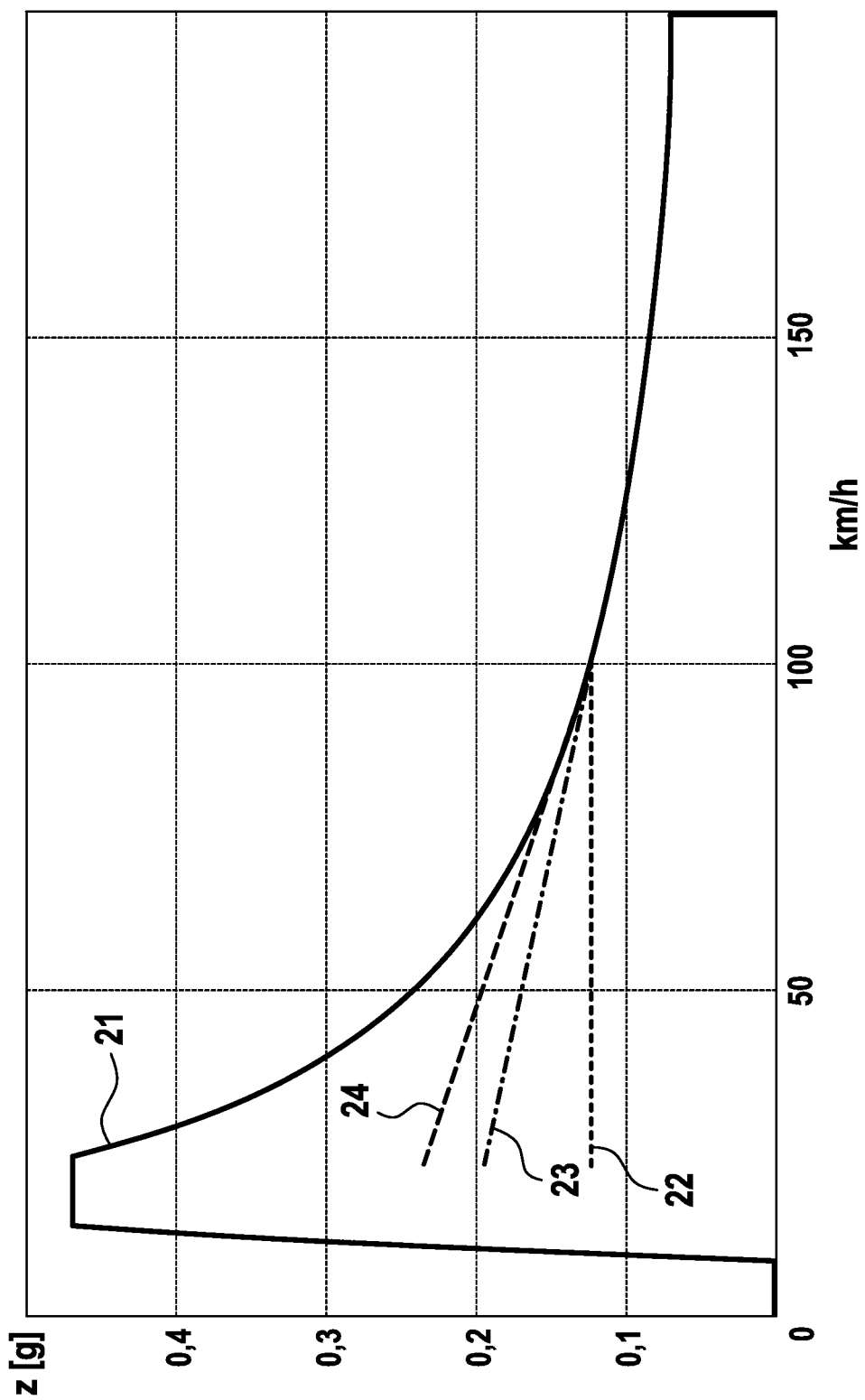
FIG. 2 shows a typical generator characteristic curve.

In FIG. 2, a typical characteristic curve of a generator is shown as an unbroken line 21, wherein an essentially constant generator power of 50 kW is assumed. A vehicle with such an electric machine could be driven solely by said machine; if an internal combustion engine is also present, the term fully hybrid vehicle is referred to here. Below a limiting speed of approximately 15 km/h, the deceleration of the generator decreases strongly, for which reason in this speed range only the friction brakes are actuated. Above the limiting speed, the generator can at maximum apply a deceleration of $$b_{gen,max} = \frac{P}{mv}$$

where P denotes the generator power, m denotes the vehicle mass and v denotes the vehicle speed.

If the driver starts a braking process at a speed of 100 km/h, the generator can only make available a low regenerative deceleration. In the case of strong braking to 20 km/h, the applied deceleration follows the line 22 of short dashes if the ratio of the braking decelerations between the friction brake and the generator is kept constant. The efficiency level of the recuperation is lower than would be possible since then only a portion of the generator deceleration which can be retrieved at low speeds is used.

It is therefore expedient to increase, as the speed decreases, the requested regenerative deceleration until the limiting speed of 15 km/h is reached. A particularly preferred procedure is to request, as a function of the duration t of the braking process, an additional generator deceleration $b_{Add}$ of $$b_{Add} = a \cdot t,$$

where a denotes a suitably selected constant. In the case of a weak, that is to say long braking operation to 20 km/h, the dashed line 24 would be obtained. This means a significantly increased efficiency level of the recuperation with moderate expenditure in terms of open-loop or closed-loop control. If the driver brakes more strongly, as a result of which a reduction in the speed to 20 km/h therefore takes place in a relatively short time, the applied deceleration follows the dot-dashed line 23. In the case of strong braking operations, the efficiency level of the recuperation therefore decreases strongly.

Since the driver primarily notices a relative additional deceleration, it is therefore particularly advantageous to select the additionally requested generator deceleration $b_{extra}$ as a function of the change in speed which has taken place since the start of the braking process, $$b_{extra} = a_{extra} \cdot (v_0 - v_{current}),$$

where $a_{extra}$ denotes a suitably selected constant, $v_0$ denotes the vehicle speed at the start of the braking process and $v_{current}$ denotes the instantaneous vehicle speed. As a result, a continuously high efficiency level of the recuperation is achieved independently of the strength of the brake pedal activation. Restrictions occur only when low friction values of the roadway surface are present since the intervention of driving stability controllers such as ABS or ESP on principle cause the generator to switch off.

A requested additional deceleration must not be too strong here since otherwise the pedal sensation of the driver is adversely affected; a braking force which is increased while the pedal position remains the same does not correspond to the behavior known from conventional brake systems. In driving trials, it has become apparent that a deceleration of 0.05 g (that is to say 5% of the acceleration due to gravity) is still not felt to be unpleasant by the driver.

Even without activation of the brakes, an intrinsic deceleration of $$b_{drag} = a_2 v^2 + a_1 v + a_0,$$

acts on the vehicle and is described by means of the parameters $a_2$, $a_1$ and $a_0$, and is caused by wind resistance, rolling resistance etc. At high speeds, the intrinsic deceleration due to the wind resistance is significantly higher than at low speeds, which is described by the $v^2$ term. This reduction in the intrinsic deceleration during a braking process can be compensated by increasing the requested generator deceleration. As a result, the efficiency level of the recuperation can be increased without causing a braking sensation which is unpleasant for the driver.

In the case of weak braking operations, the generator can in principle make available the entire desired deceleration, with the result that the efficiency level of the recuperation is frequently already optimal. In order to make available a speed dependence of the total deceleration which is uninfluenced by the strength of the pedal activation, that is to say make available a consistent behavior of the brake system, it is expediently also possible then to request an increased generator deceleration.

With respect to control of the regenerative braking process which is as simple as possible, it is advantageous to define for the compensation of the reduced intrinsic deceleration and the additionally requested regenerative deceleration a formula which is evaluated for performing open-loop or closed-loop control of the requested regenerative deceleration. An example of a corresponding formula is specified below.

The requested regenerative deceleration $b_{requested}$ cannot be greater than the generator deceleration which increases with decreasing speed:

$$-\frac{db_{requested}}{dv} \leq -\frac{db_{gen,max}}{dv} = \frac{P}{mv^2}$$

At the same time, the requested regenerative deceleration must at least compensate a change in the intrinsic deceleration in order to make available appropriately increased energy recovery:

$$-\frac{db_{requested}}{dv} \geq +\frac{db_{drag}}{dv} = 2a_2v + a_1$$

It is advantageous to add an additional constant $a_{extra}$ since this permits a further increase in the efficiency level of the recuperation.

Figure 3:
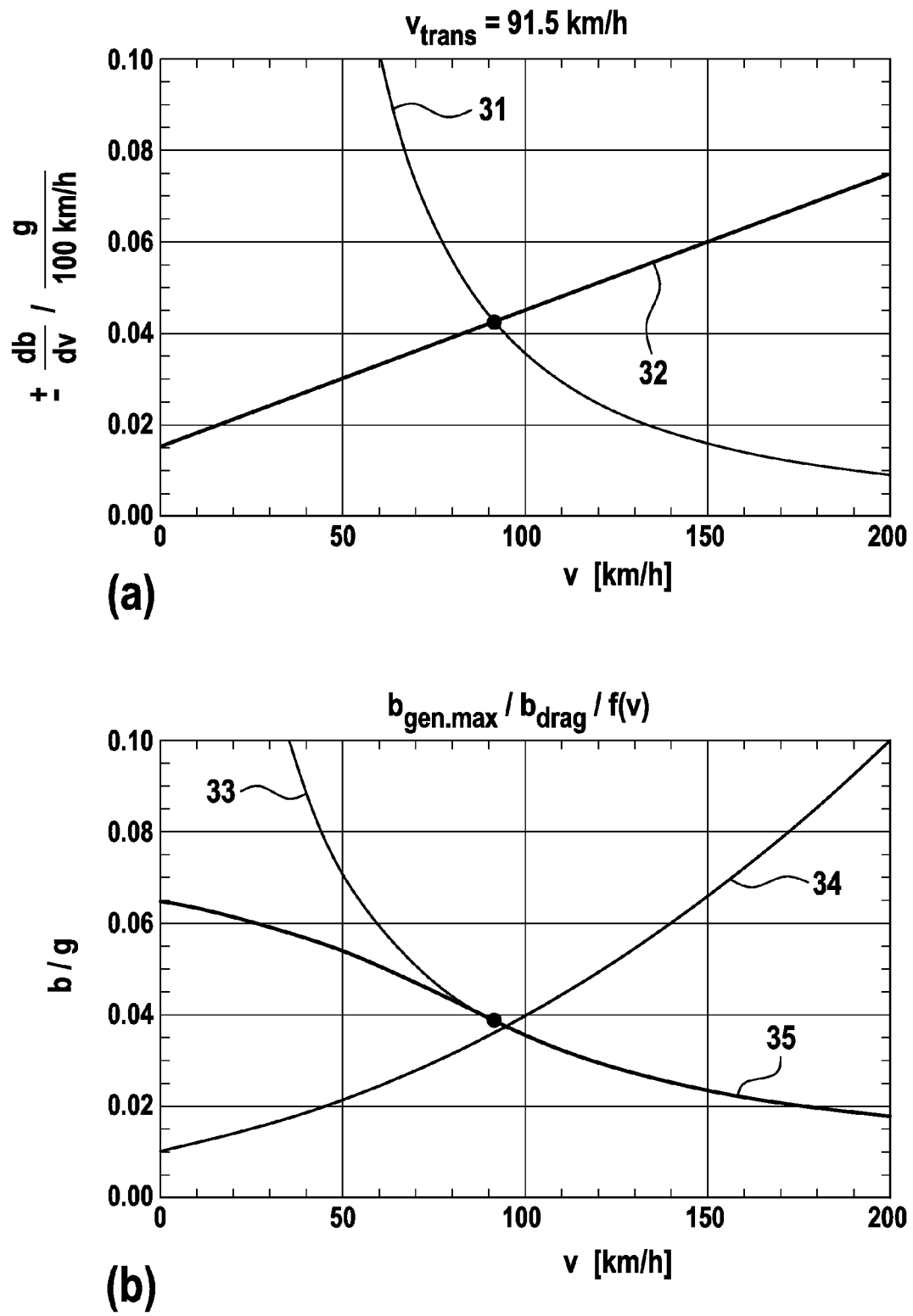
FIG. 3 shows a diagram of the different dependence of the intrinsic deceleration and regenerative deceleration on the speed.

FIG. 3a) shows the speed-dependent change in the term relating to the generator deceleration as a line 31 and that in the term relating to the intrinsic deceleration as a line 32, wherein here the additional constant has been included. In the case of a speed $v_{transition}$, the two curves intersect:

$$\frac{P}{mv_{transition}^2} = 2a_2 v_{transition} + a_1 + a_{extra}$$

This speed depends only on variables which are measured by the manufacturer of the vehicle or are defined in the conception phase, for this reason, $v_{transition}$ can be calculated before the start of the series fabrication using known methods.

If it is taken into account that in each case the lower of the two lines from FIG. 3a) is relevant, the formula can be determined for the regenerative deceleration which is to be additionally requested:

$$b_{requested} = \int_{v_0}^{v} \frac{db_{requested}}{dv} dv = f(v) - f(v_0)$$

where $$f(v) = \begin{cases} \frac{P}{mv} & (v \geq v_{transition}) \\ \frac{P}{mv_{transition}} + a_2(v_{transition}^2 - v^2) + & (v < v_{transition}) \\ (a_1 + a_{extra})(v_{transition} - v) & \end{cases}$$

FIG. 3b) illustrates the maximum deceleration 33 applied by the generator, the intrinsic deceleration of the vehicle 34 and the profile of f(v) 35. While at high speeds the available regenerative deceleration is used to an optimum degree, this can take place only to a restricted degree at low speeds without adversely affecting the braking behavior in a way which is unpleasant for the driver.

The formula for $b_{requested}$ is preferably stored in the control unit with the result that during the journey only the vehicle speed $v_0$ at the start of the braking and the instantaneous vehicle speed v have to be determined. Expediently, a value of approximately 0.1 g per 100 km/h is defined for $a_{extra}$. Compared to braking without an additional request, the efficiency level of the recuperation is significantly increased without reducing the driving comfort.

While the above description constitutes the preferred embodiment of the present invention, it will be appreciated that the invention is susceptible to modification, variation and change without departing from the proper scope and fair meaning of the accompanying claims.

The invention claimed is:

1. A method in which open or closed-loop control of a motor vehicle brake system of a motor vehicle is carried out which comprises the steps of;
   providing friction brakes on the wheels of at least a first axle of one or more axles, providing brake pressure generating means for the wheels of at least the first axle arranged in an operative connection to a brake pedal, the brake pressure generating means used to provide a braking force of the friction brakes on the wheels of at least the first axle of the one or more axles;
   providing at least one electrical machine in an operative connection to at least the first axle of the one or more axles which can be used by applying an electrically regenerative braking torque in a braking process for converting kinetic energy of the vehicle into electrical energy thereby providing recuperation, in that in order to raise the efficiency level of the recuperation, increasing regenerative deceleration resulting from the regenerative braking torque in the case of an unchanged position of the brake pedal or force applied to the brake pedal;
   wherein during the braking process and as the regenerative deceleration is increased beyond an amount corresponding to a position of the brake pedal or a force applied to the brake pedal, the regenerative deceleration is increased in such a way that the braking force of the friction brakes is kept constant; and
   increasing an overall braking force of the vehicle beyond what is requested by the driver.

2. The method as claimed in claim 1 wherein a decrease in the deceleration of the vehicle is at least compensated by increasing the regenerative deceleration.

3. The method as claimed in claim 1, wherein the additionally requested regenerative deceleration is selected as a function of the speed of the vehicle at the start of the braking process.

4. The method as claimed in claim 1 wherein the additionally requested regenerative deceleration is adapted continuously or quasi-continuously during the braking process.

5. The method as claimed in claim 1, wherein the additionally requested regenerative deceleration is selected in proportion to the change in speed of the vehicle since the start of the braking process.

6. A method in which open or closed-loop control of a motor vehicle brake system of a motor vehicle is carried out which comprises the steps of:
   providing friction brakes on the wheels of at least a first axle of one or more axles, providing brake pressure generating means for the wheels of at least the first axle arranged in direct operative connection to a brake pedal;

providing at least one electrical machine in an operative connection to at least the first axle of the one or more axles which can be used by applying an electrically regenerative braking torque in a braking process for converting kinetic energy of the vehicle into electrical energy thereby providing recuperation, in that in order to raise the efficiency level of the recuperation, increasing regenerative deceleration resulting from the regenerative braking torque in the case of an unchanged position of the brake pedal or force applied to the brake pedal;

wherein as a speed of the vehicle decreases, requesting a greater regenerative deceleration, wherein deceleration provided by the friction brakes is correspondingly reduced;

wherein the additionally requested regenerative deceleration is selected in proportion to a change in speed of the vehicle since the start of the braking process;

wherein a proportionality constant for the regenerative deceleration is approximate 0.05 g to approximately 0.2 g per 100 km/h.

7. The method as claimed in claim 1 wherein the additionally requested regenerative deceleration is selected as a function of the deceleration at the start of the braking process.

8. The method as claimed in claim 1 wherein the additionally requested regenerative deceleration is selected as a function of the duration of the braking process.

9. The method as claimed in claim 1 further comprising checking the stability of the driving state of the vehicle by evaluating at least one of wheel speed information, acceleration information, and yaw rate sensor information, and when a stable driving state of the vehicle is present, wherein the electrically regenerative braking torque at at least the first axle in an operative connection with the electric machine is controlled in such a way that the electrically regenerative braking torque is greater than a braking torque of the friction brakes present at at least the first axle of the one or more axles braked only with the friction brakes.

10. The method as claimed in claim 9, wherein when the stable driving state is present, a braking torque at a regeneratively braked rear axle is set up to 15% higher than corresponds to the fraction of the braking torque at a front axle which is to be applied according to an ideal braking force distribution.

11. A motor vehicle brake system for a motor vehicle comprising friction brakes at the wheels of at least a first axle of one or more axles, brake pressure generating means for the wheels of at least the first axle arranged in a direct operative connection to a brake pedal, and at least one electric machine in an operative connection to the at least first axle of the one or more axles which, by applying an electrically regenerative braking torque, can be used to convert kinetic energy of the vehicle into electrical energy thereby providing recuperation, in that actuation or closed-loop control takes place the brake system configured to raise the efficiency level of the recuperation by increasing regenerative deceleration resulting from the regenerative braking torque in the case of an unchanged position of the brake pedal or force applied to the brake pedal;

wherein the brake pressure generating means produces braking force of the friction brakes, and the braking force of the friction brake is kept constant in response to increasing regenerative deceleration resulting from the regenerative braking torque in the case of the unchanged position of the pedal or force applied to the brake pedal; and wherein an overall braking force of the vehicle is increased beyond what is requested by the driver.

12. The brake system as claimed in claim 11 wherein the motor vehicle having an internal combustion engine.

13. The method of claim 1, wherein the one or more axles comprises at least the first axle and a second axle, the braking force of the friction brakes is produced on the wheels of the first and second axles, and the electrically regenerative braking torque is produced on the wheels of at least the first axle.

14. A method in which open or closed-loop control of a motor vehicle brake system of a motor vehicle is carried out which comprises the steps of:

providing friction brakes on the wheels of at least a first axle of one or more axles, providing brake pressure generating means for the wheels of at least the first axle arranged in an operative connection to a brake pedal, the brake pressure generating means used to provide a braking force of the friction brakes on the wheels of at least the first axle of the one or more axles;

providing at least one electrical machine in an operative connection to at least the first axle of the one or more axles which can be used by applying an electrically regenerative braking torque in a braking process for converting kinetic energy of the vehicle into electrical energy thereby providing recuperation, in that in order to raise the efficiency level of the recuperation, increasing regenerative deceleration resulting from the regenerative braking torque in the case of an unchanged position of the brake pedal or force applied to the brake pedal;

wherein during the braking process and as the regenerative deceleration is increased beyond an amount corresponding to a position of the brake pedal or a force applied to the brake pedal, the regenerative deceleration is increased in such a way that the braking force of the friction brakes is kept constant; and wherein an overall braking force of the vehicle including a braking force from the regenerative braking torque and the braking force of the friction brakes exceeds a braking force requested by the driver via the brake pedal.

* * * * *